United States Patent
Kim et al.

(10) Patent No.: US 11,608,868 B2
(45) Date of Patent: Mar. 21, 2023

(54) ELECTRONIC BRAKE MOTOR STRUCTURE WITH BALL SCREW

(71) Applicant: BMC CO., LTD., Anseong-si (KR)

(72) Inventors: Ok Yun Kim, Seoul (KR); Kea Ho Lee, Gwangju (KR); Haeng Chul Sin, Gwangju (KR)

(73) Assignee: BMC CO., LTD., Anseong-si (KR)

( * ) Notice: Subject to any disclaimer, the term of this patent is extended or adjusted under 35 U.S.C. 154(b) by 665 days.

(21) Appl. No.: 16/622,947

(22) PCT Filed: Aug. 21, 2018

(86) PCT No.: PCT/KR2018/009602
§ 371 (c)(1),
(2) Date: Dec. 16, 2019

(87) PCT Pub. No.: WO2019/066257
PCT Pub. Date: Apr. 4, 2019

(65) Prior Publication Data
US 2020/0208698 A1    Jul. 2, 2020

(30) Foreign Application Priority Data

Sep. 26, 2017 (KR) .......................... 10-2017-0123923

(51) Int. Cl.
*H02K 5/22* (2006.01)
*H02K 11/215* (2016.01)
(Continued)

(52) U.S. Cl.
CPC ........... *F16D 65/14* (2013.01); *H02K 5/1737* (2013.01); *H02K 5/225* (2013.01); *H02K 11/215* (2016.01); *H02K 11/25* (2016.01); *F16D 2121/24* (2013.01)

(58) Field of Classification Search
CPC . F16D 2121/00; F16D 2121/24; H02K 5/225; H02K 7/06; H02K 11/21; H02K 11/215; H02K 11/25
See application file for complete search history.

(56) References Cited

U.S. PATENT DOCUMENTS

| 5,723,923 A | * | 3/1998 | Clagett | .................. H02K 7/025 310/74 |
| 2008/0190226 A1 | * | 8/2008 | Kobayashi | .......... F16H 25/2204 74/89.34 |

(Continued)

FOREIGN PATENT DOCUMENTS

| JP | 2010-141968 A | 6/2010 |
| KR | 10-2010-0089455 A | 8/2010 |

(Continued)

OTHER PUBLICATIONS

International Search Report for PCT/KR2018/009602 dated Oct. 5, 2018 from Korean Intellectual Property Office.

*Primary Examiner* — Eric Johnson
(74) *Attorney, Agent, or Firm* — Revolution IP, PLLC (57) ABSTRACT

An electronic brake motor structure includes a lower housing coupled to a block; a ball screw installed in the center inside the housing and block; a nut member into which the ball screw penetrates to be coupled therewith; a piston coupled to an outer side of the nut member; a hollow shaft coupled to an outer side of a lower part of the piston; a rotor module including a rotor and a magnet, coupled to an outer side of the hollow shaft; a stator module coupled to an outer side of the rotor module; an upper bracket for mounting a first bearing to thereinside; a driven shaft, coupled to an upper part of the ball screw to support the ball screw; a joint member coupled to a bottom of the ball screw with a mounting bolt to support the ball screw and a fourth bearing.

12 Claims, 11 Drawing Sheets

(51) Int. Cl.
    *H02K 11/25*     (2016.01)
    *F16D 65/14*     (2006.01)
    *H02K 5/173*     (2006.01)
    F16D 121/24     (2012.01)

(56) References Cited

U.S. PATENT DOCUMENTS

| | | |
|---|---|---|
| 2011/0285220 A1 | 11/2011 | Sonohara et al. |
| 2013/0112104 A1 | 5/2013 | Tamai et al. |
| 2017/0019000 A1* | 1/2017 | Sakamoto ................ G01K 1/16 |
| 2017/0089436 A1* | 3/2017 | Eyraud ................ F16C 33/581 |
| 2018/0009425 A1* | 1/2018 | Feigel ................ B60T 13/145 |
| 2018/0029575 A1* | 2/2018 | Malwitz ................ F16D 65/14 |

FOREIGN PATENT DOCUMENTS

| | | |
|---|---|---|
| KR | 10-2013-0016428 A | 2/2013 |
| KR | 10-2015-0117419 A | 10/2015 |
| KR | 10-2016-0128195 A | 11/2016 |
| KR | 10-2017-0052981 A | 5/2017 |

\* cited by examiner

ELECTRONIC BRAKE MOTOR STRUCTURE WITH BALL SCREW

TECHNICAL FIELD

The present invention relates to an electronic brake motor structure with a ball screw. More specifically, the present invention improves assemblability of an electronic brake motor which is applied to an integrated electronic brake (IDB) system of a vehicle, and improves the installation structure of a thermistor which senses a temperature inside the motor and a power connection and supply terminal, thereby enhancing stability and efficiency of the motor.

BACKGROUND ART

In general, motors are devices which generate a rotational force by electromagnetic interaction, and are widely used in equipment which conducts control operation throughout the industry. For example, motors used in vehicles are required to have high operational reliability and stability. Especially, these motors are very important since they provide power to the part which is directly related to safety.

As disclosed in Korean Patent Laid-Open No. 10-2016-0128195, conventional devices which convert a rotary motion of a motor into a linear motion are configured to comprise a common ball nut which delivers a rotary motion of a rod member as a linear motion, and the ball nut is arranged to be movable on the rod member.

Upon specifically reviewing the above, the technical feature of the above-mentioned prior art comprises a housing having a bearing surface that sustains at least one bearing; a hollow shaft coupled to the housing rotatably around a first rotation axis, wherein the hollow shaft has at least one outer circumferential stepped shaft portion and at least one inner circumferential stepped shaft portion; a rod member coupled to the housing rotatably around the first rotation axis having at least one contacting portion and at least one protruding part, wherein the at least one contacting portion contacts at least a part of the hollow shaft in a radial direction and the at least one protruding part abuts the at least one inner circumferential stepped shaft portion in an axial direction; the at least one bearing comprising at least one circular inner support part and at least one circular outer support part supporting the hollow shaft and the rod member connected to the housing rotatably around the first rotation axis, wherein the at least one circular inner support part abuts at least a part of the at least one outer circumferential stepped shaft portion in the axial direction and the at least one circular outer support part abuts the bearing surface of the housing in the axial direction; and a stopper member fixed to the rod member, wherein the stopper member abuts the at least one circular inner support part in the axial direction.

According to the prior art disclosing the above-mentioned feature, the rod member, i.e., the ball screw, is configured to be installed inside the hollow shaft and supported by the stopper member. The ball screw is supported by the inner surface of the hollow shaft and a supporting means of the stopper member, and thereby the ball screw is supported and coupled while it floats in the air.

According to the installation structure of the ball screw as above, the ball screw may be shaken when the motor rotates at a high speed, which causes unstable rotation of the ball screw. In order to overcome the above problem, it is preferable to couple the upper part of the ball screw with a bearing installed in a separate housing. However, in this case, a supporting member is required for maintaining the coupling of the bearing with the ball screw. However, the prior art fails to disclose a feature therefor.

Especially, according to the prior art, braking problems may occur when the temperature generated inside the motor is sensed and thereby the brake motor is blocked due to overcurrent conditions, and thus it is typical to install a thermistor which protects against overcurrent conditions. However, the prior art neither exactly discloses the installation of the thermistor, nor discloses the installation of a bus-bar, which is the power connection and supply terminal for supplying power to a circuit board installed inside the motor.

Therefore, in order to secure the above-stated reliability and stability of the motor, it is preferable to provide the installation of the thermistor and bus-bar with simple constitution and to provide the same so as to secure stability, thereby promoting quality and reliability of the motor.

PRIOR ART

Patent Document (Patent Document 1) Korean Patent Laid-Open No. 10-2016-0128195

DISCLOSURE OF INVENTION

Technical Problem

It is an object of the present invention to improve the installation structure of a ball screw which helps the rotation of a motor, thereby improving assemblability.

Also, it is an object of the present invention to ensure solid coupling of a ball screw which helps the rotation of a motor, thereby promoting smooth rotation without shaking and reducing noises and vibration.

Also, it is an object of the present invention to provide the installation structure of a thermistor which senses a temperature by the heat generated inside a motor, and a bus-bar for supplying power, thereby surely providing the control by sensing a temperature inside the motor and securing stability of the motor.

Solution to Problem

The present invention comprises a lower housing coupled to a block; a ball screw installed in the center inside the housing and block, the ball screw having a screw formed on an outer circumferential surface thereof; a nut member into which the ball screw penetrates to be coupled therewith, the nut member having a groove pattern corresponding to the ball screw on an inner circumferential surface thereof; a piston coupled to an outer side of the nut member; a hollow shaft coupled to an outer side of a lower part of the piston; a rotor module comprising a rotor and a magnet, coupled to an outer side of the hollow shaft; a stator module coupled to an outer side of the rotor module; an upper bracket for mounting a first bearing thereinside while supporting an upper part of the stator module; a driven shaft made of a brass material, coupled to an upper part of the ball screw to support the ball screw; and a joint member coupled to a bottom of the ball screw with a mounting bolt to support the ball screw and a fourth bearing, wherein the first bearing is installed on an annular locking protrusion formed on an outer side of an upper part of the hollow shaft, and the rotor module is installed on an annular locking protrusion formed on an outer side of a lower part of the hollow shaft, and the electronic brake motor structure with ball screw comprises a thermistor mounting means and a bus-bar mounting means which are installed on an upper insulator coupled to an upper part of the stator module.

Advantageous Effects of Invention

The present invention improves the installation structure of the ball screw helping the rotation of the motor to enhance assemblability, thereby reducing manufacturing costs, and promotes smooth rotation without shaking through solid coupling, thereby reducing noises and vibration.

Also, the present invention discloses the installation structure of the thermistor sensing the temperature by the heat generated inside the motor and the bus-bar for supplying power to surely provide the control by sensing the temperature inside the motor, prevent the motor from being damaged by high temperature and short phenomenon, and secure safety of the motor, thereby greatly promoting quality and reliability of the motor.

MODE FOR THE INVENTION

Figure 1:
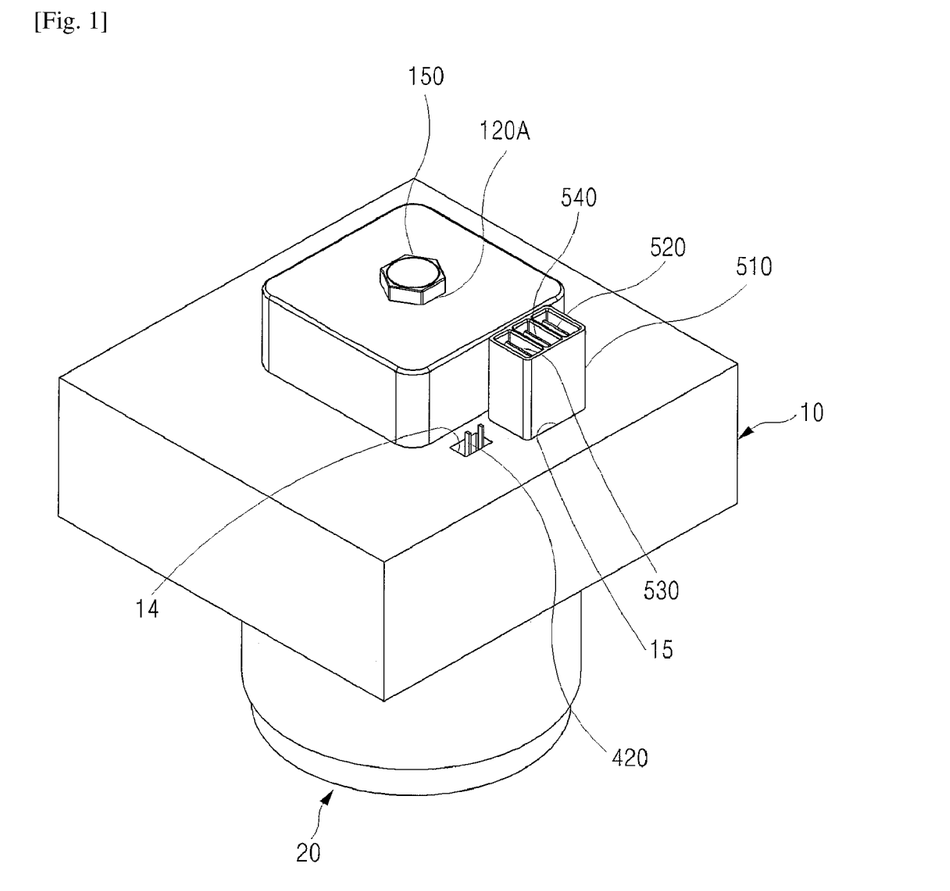
FIG. 1 is a perspective view illustrating the coupling of a motor according to a first embodiment of the present invention.

FIG. 1 is a perspective view illustrating the coupling of a motor according to a first embodiment of the present invention, which illustrates the state where a block 10 is coupled to a lower housing 20, and a thermistor sensor 420 and bus-bar power connection terminals 520, 530 and 540 protrude through the upper part of the block 10.

Figure 2:
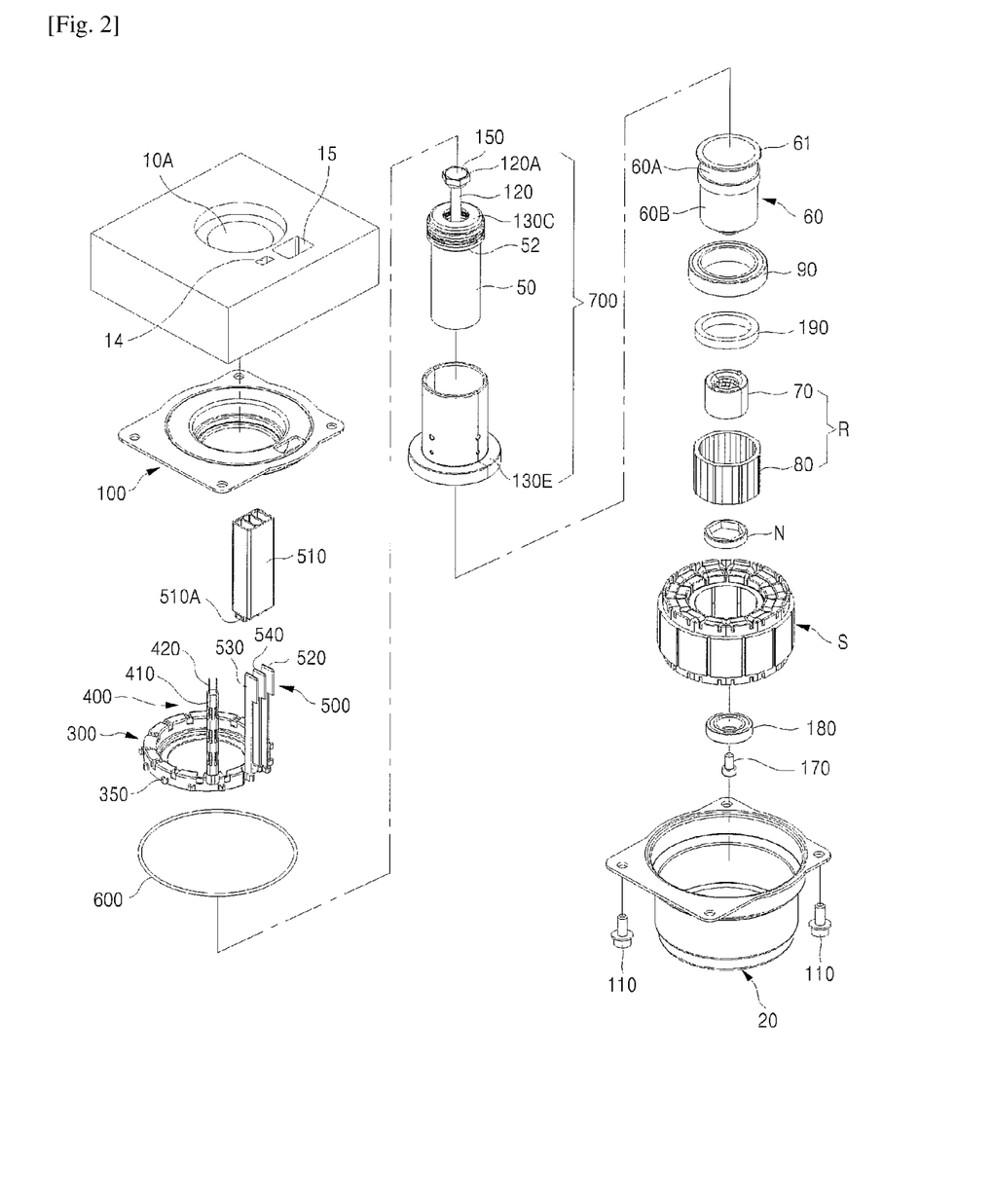
FIG. 2 is an exploded perspective view illustrating the motor of the present invention.

FIG. 2 illustrates the state where the block 10 and the lower housing 20 of the present invention are separated; a ball screw 30, a nut member 40, a piston 50, a hollow shaft 60, a rotor module R, a stator module S, a first bearing 90 and a fourth bearings 180, which are installed inside the block 10 and the lower housing 20, are separated; and a thermistor mounting means 400 and a bus-bar mounting means 500 are coupled to and separated from an upper insulator 300.

Figure 3:
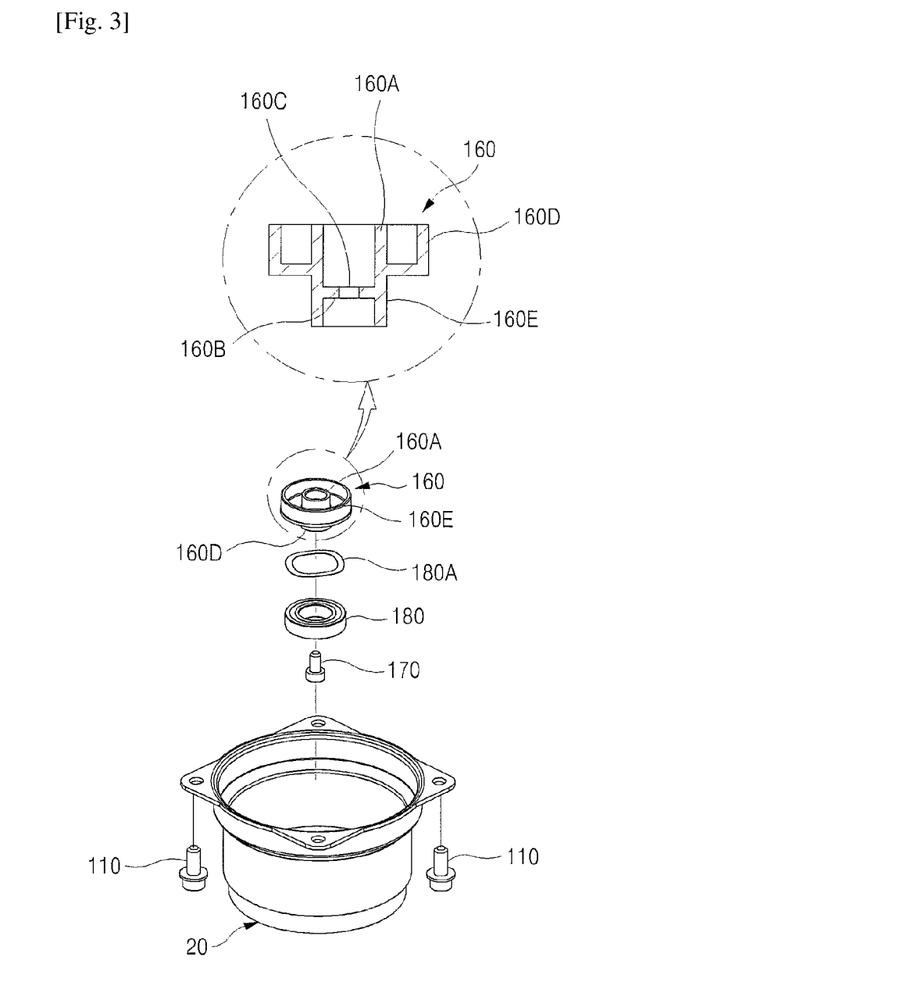
FIG. 3 is an exploded perspective view illustrating part of a joint member according to another embodiment of the present invention.
Figure 4:
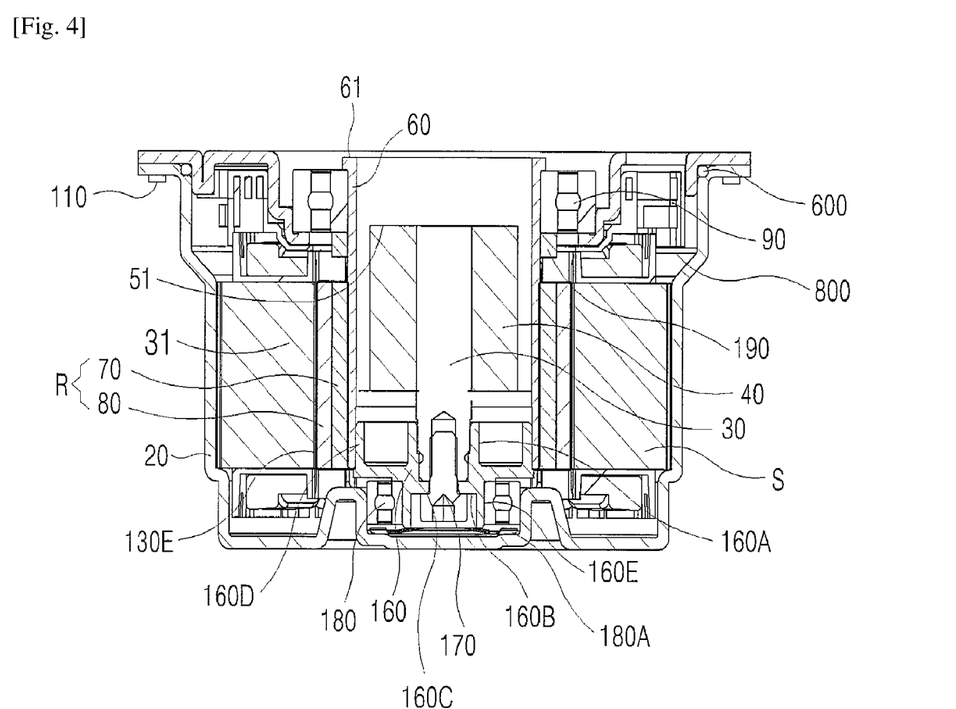
FIG. 4 is a cross-sectional view illustrating part of the motor in which the joint member of FIG. 3 is installed.

FIG. 3 is an exploded perspective view illustrating part of a joint member 160 according to another embodiment of the present invention, and FIG. 4 is a cross-sectional view illustrating part of the motor in which the joint member 160 of FIG. 3 is installed.

Figure 5:
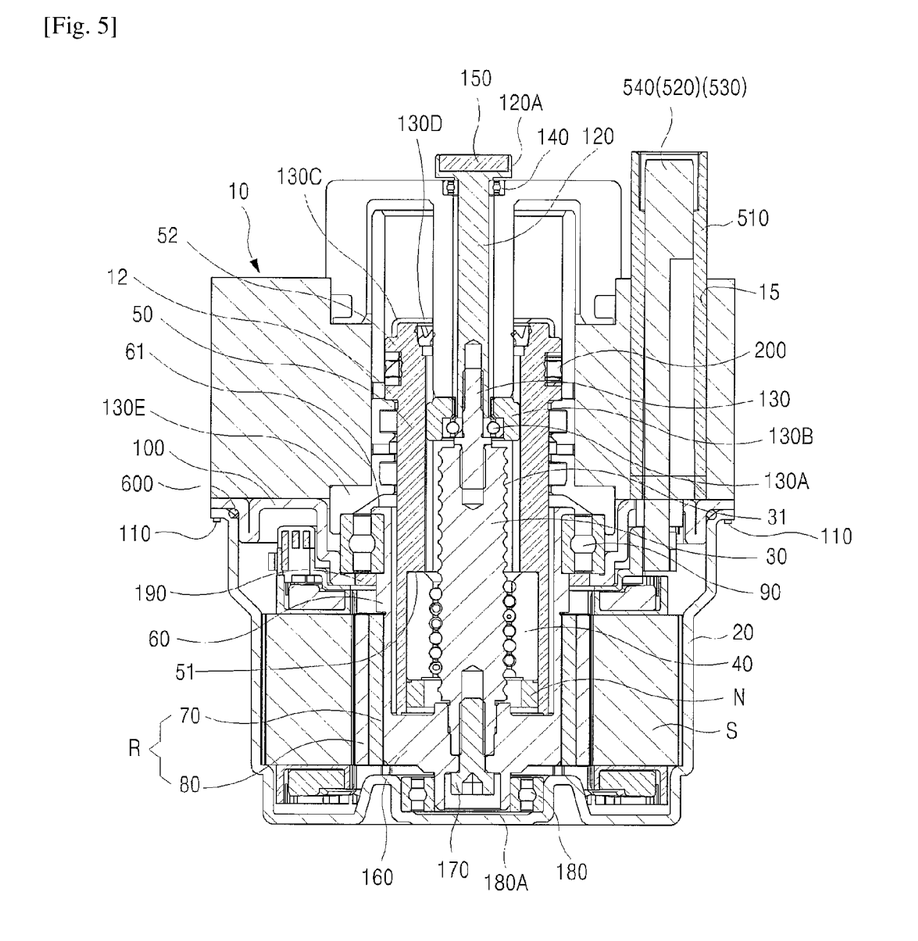
FIG. 5 is a cross-sectional view illustrating the coupling relation between a block and a lower housing of the present invention.

FIG. 5 is a cross-sectional view illustrating the inner coupling based on FIG. 1 and FIG. 2.

Figure 6:
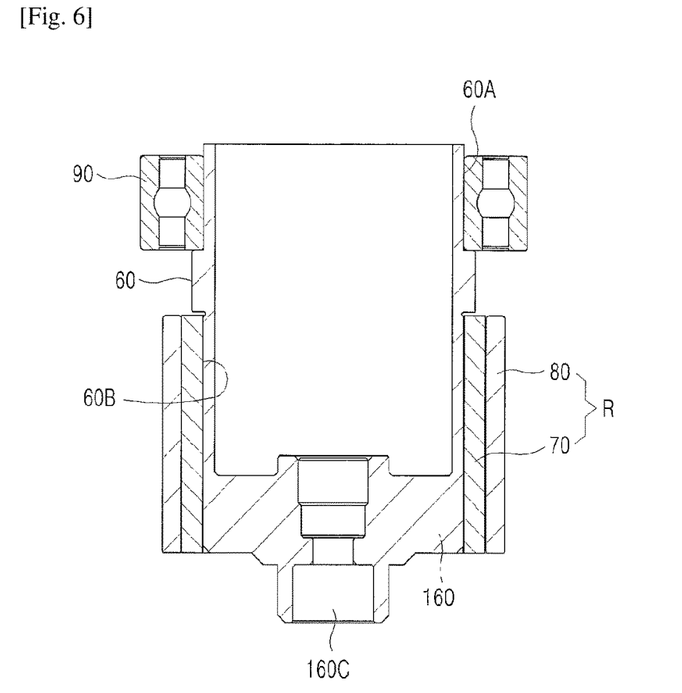
FIG. 6 is an enlarged cross-sectional view illustrating part of the state where a first bearing and a rotor module are mounted on annular locking protrusions formed on outer circumference of upper and lower parts of the hollow shaft of the present invention.

FIG. 6 is an enlarged cross-sectional view illustrating part of the state where the first bearing 90 and the rotor module R are mounted on annular locking protrusions 60A and 60B formed on outer circumference of upper and lower parts of the hollow shaft 60 of the present invention.

Figure 7:
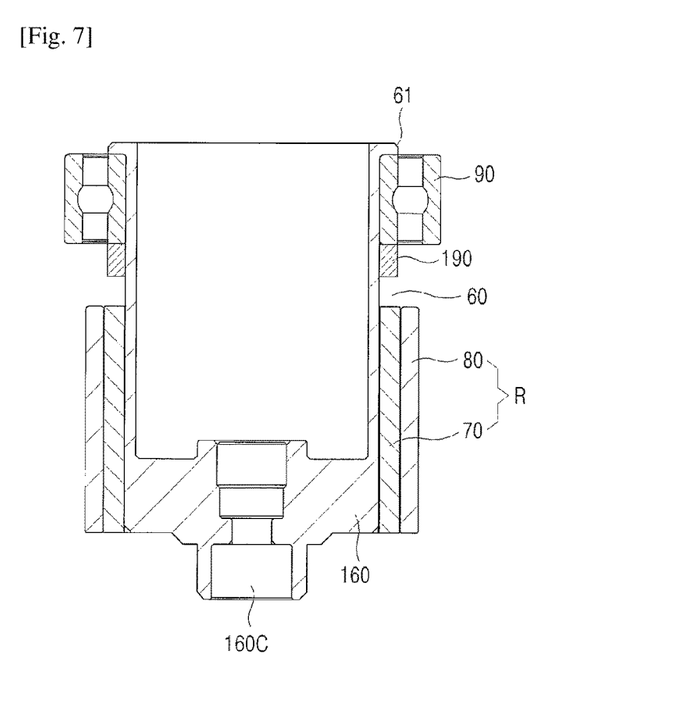
FIG. 7 is an enlarged cross-sectional view illustrating part of the state where the first bearing and the rotor module are press-fitted and installed on the outer circumference of the upper and lower parts of the hollow shaft of the present invention, and a stop ring is welded around the bottom of an inner race of the first bearing.

FIG. 7 is an enlarged cross-sectional view illustrating part of the state where the first bearing 90 and the rotor module R are press-fitted and installed on the outer circumference of the upper and lower parts of the hollow shaft 60 of the present invention, and a stop ring 190 is welded around the bottom of an inner race of the first bearing 90.

Figure 8:
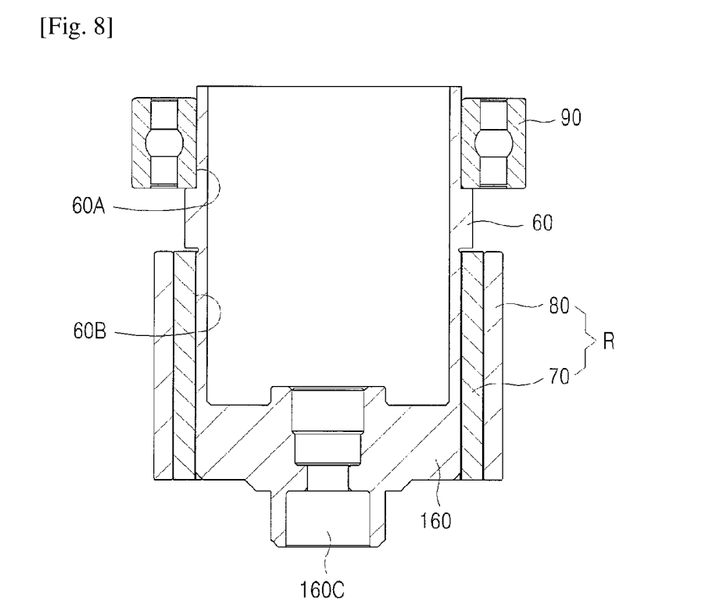
FIG. 8 is an enlarged cross-sectional view illustrating part of the state where the first bearing and the rotor module are mounted on the annular locking protrusions formed on the outer circumference of the upper and lower parts of the hollow shaft of the present invention.

FIG. 8 is an enlarged cross-sectional view illustrating part of the state where the first bearing 90 and the rotor module R are mounted on the annular locking protrusions 60A and 60B formed on the outer circumference of the upper and lower parts of the hollow shaft 60 of the present invention, which illustrates the state before an engaged annular protrusion 61 is formed on an outer side of an upper part of the hollow shaft 60.

Figure 9:
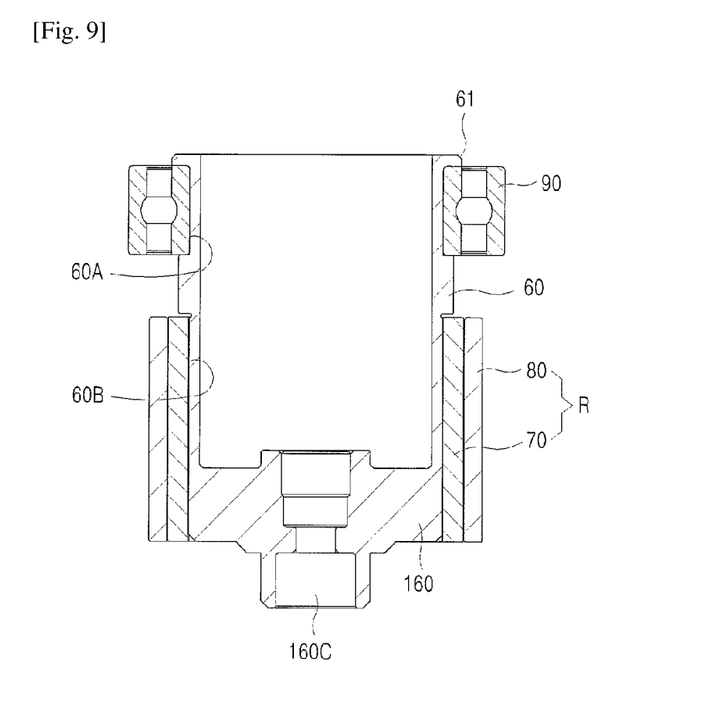
FIG. 9 is an enlarged cross-sectional view illustrating part of the state where an engaged annular protrusion formed by curling an upper part of the hollow shaft of FIG. 8 outwards presses an upper part of the inner race of the first bearing.

FIG. 9 is an enlarged cross-sectional view illustrating part of the state where the engaged annular protrusion 61 formed by curling the upper part of the hollow shaft 60 of FIG. 8 outwards presses an upper part of the inner race of the first bearing 90.

Figure 10:
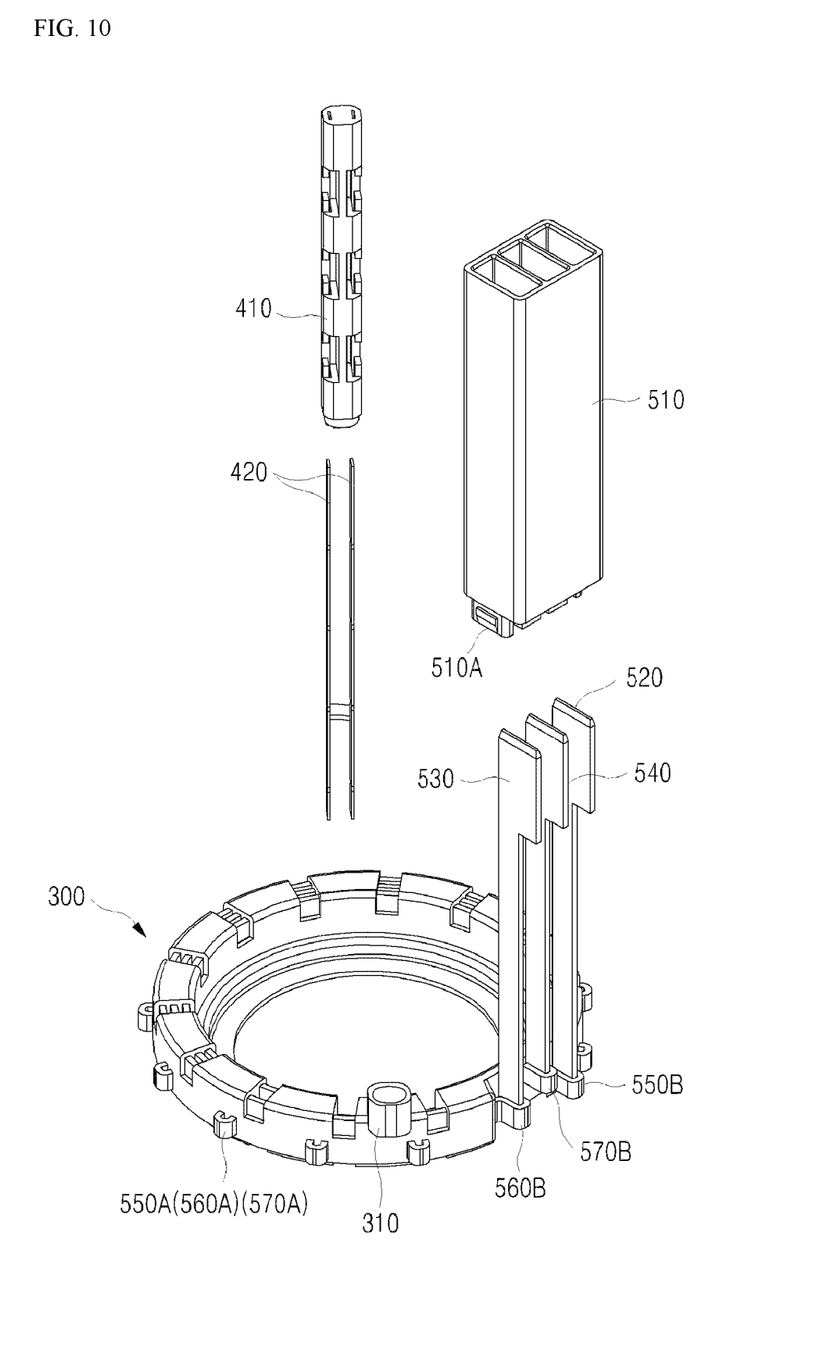
FIG. 10, which shows an excerpt of main parts of the present invention, is an exploded perspective view illustrating the coupling relation between the stator module and the thermistor and bus-bar mounting means.
Figure 11:
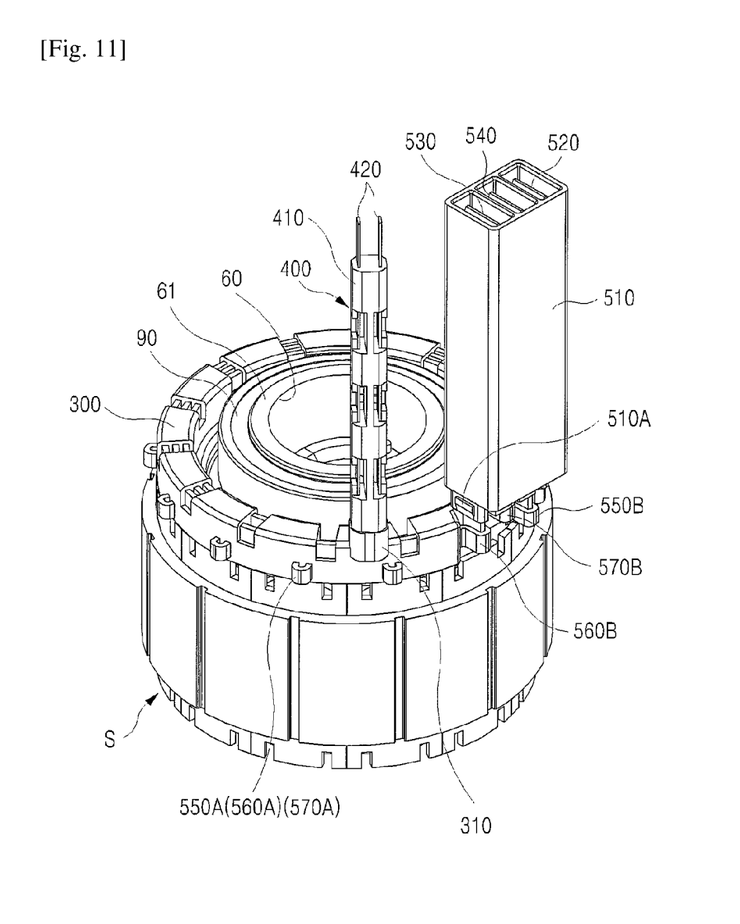
FIG. 11 is a perspective view illustrating the coupling of FIG. 10.

FIG. 10, which shows an excerpt of main parts of the present invention, is an exploded perspective view illustrating the coupling relation between the stator module S and the thermistor and bus-bar mounting means, and FIG. 11 is a perspective view illustrating the coupling of a thermistor housing 410 and a bus-bar housing 510.

Figure 12:
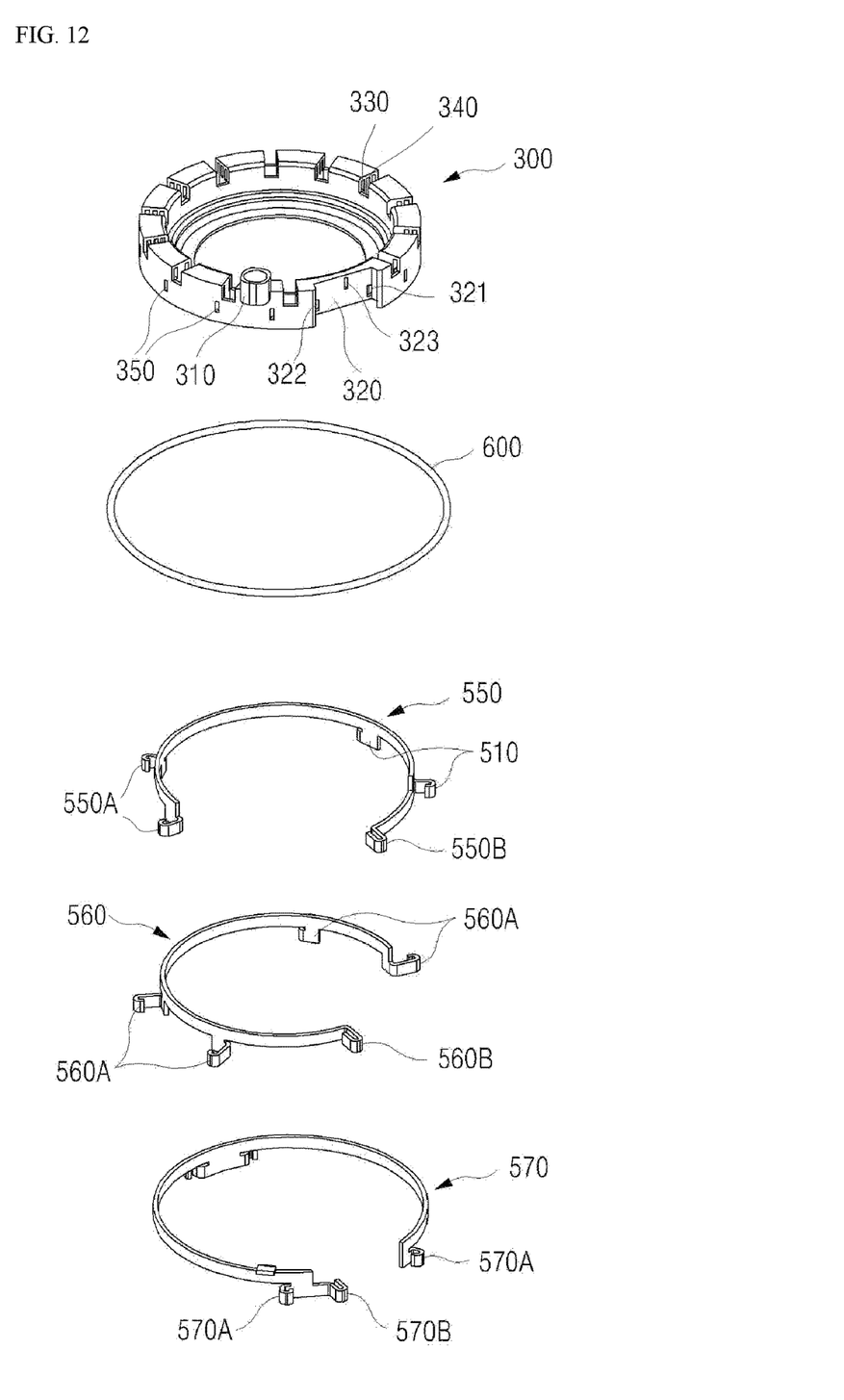
FIG. 12 is an exploded perspective view illustrating the thermistor and bus-bar mounting means of the present invention.

FIG. 12 is an exploded perspective view illustrating the thermistor and bus-bar mounting means 400 and 500 of the present invention, where the upper insulator 300, an O-ring 600, and a coupling member 550 for connecting a first power supply terminal, a coupling member 560 for connecting a second power supply terminal, and a coupling member 570 for connecting a third power supply terminal are separated.

Figure 13:
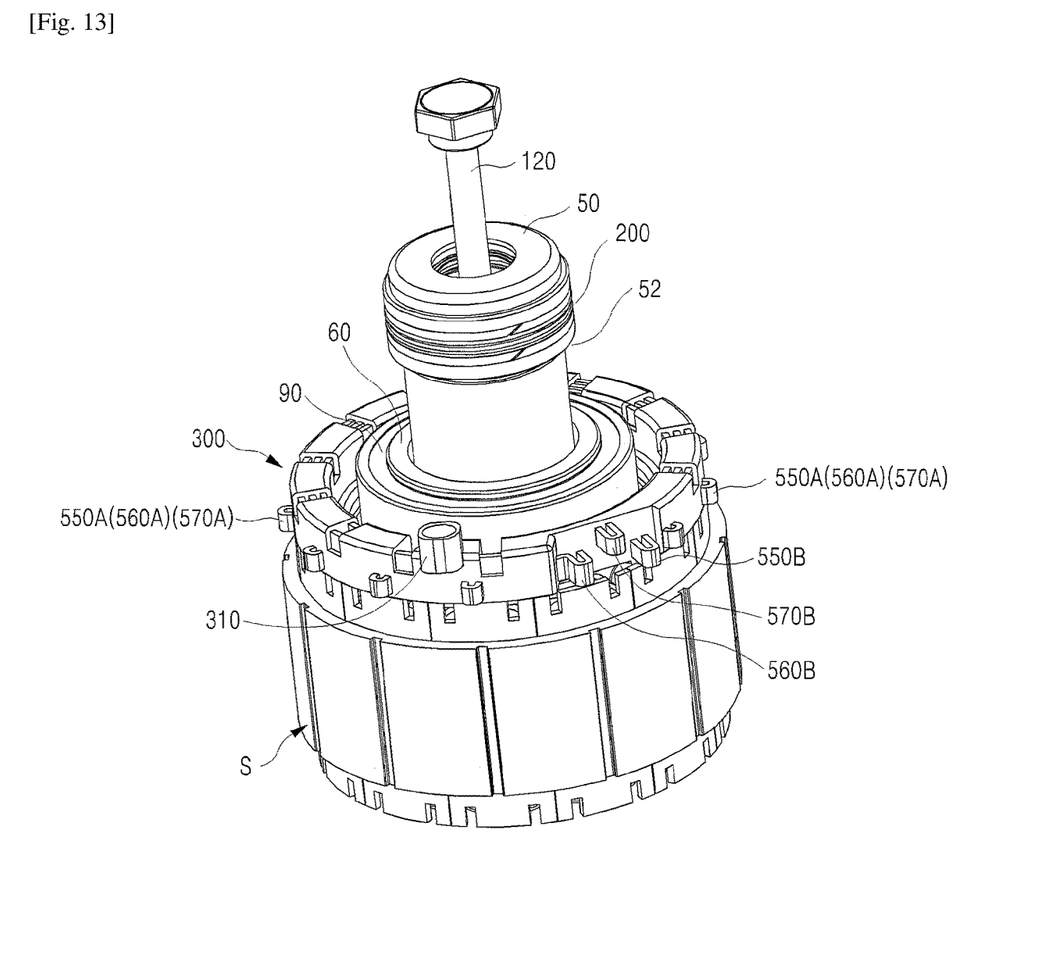
FIG. 13 is a perspective view illustrating the coupling of main parts excerpted of the present invention where the thermistor and bus-bar mounting means of the present invention are coupled.

FIG. 13 is a perspective view illustrating the coupling of main parts excerpted of the present invention for showing locking protrusions and connection terminal insertion parts of the bus-bar mounting means 500 while the thermistor and bus-bar mounting means 400 and 500 of the present invention are coupled to the upper insulator 300, and the hollow shaft 60 and the piston 50 are coupled to the inside of the stator module S.

Embodiments of the present invention will be described with reference to the above-mentioned drawings.

With reference to FIG. 1 in which the block 10 and the lower housing 20 are coupled, FIG. 2 illustrating the exploded state of the present invention, and FIG. 5 which is a cross-sectional view illustrating the coupling, the ball screw 30 is installed in the center inside the block 10 and the lower housing 20, and has a screw 31 formed on an outer circumferential surface thereof.

The nut member 40 having a groove pattern corresponding to the screw 31 of the ball screw 30 on an inner circumferential surface thereof is coupled to the outer side of the lower part of the ball screw 30, the piston 50 is coupled to the outer side of the nut member 40, and the rotor module R comprising a rotor 70 and a magnet 80, coupled to the outer side of the hollow shaft 60 coupled to the outer side of the lower part of the piston 50 is installed.

An upper bracket 100 for mounting the first bearing 90 thereinside while supporting the upper part of the stator module S coupled to the outer side of the rotor module R is fastened and coupled between the lower housing 20 and the block 10 with a fastening bolt 110.

Additionally, a driven shaft 120, made of a brass material, which supports the ball screw is inserted and fixed to the upper part of the ball screw 30, and the driven shaft 120 and the ball screw 30 are connected by a connecting member 130 having upper and lower threads. The second bearing 140 is installed on an annular protrusion 120A of the driven shaft 120. A motor speed sensing magnet sensor 150 may be installed in a recess of an upper central part of the annular protrusion 120A of the driven shaft 120, and a bearing supporting member 130B may be installed on an outer side of the third bearing 130A installed around an outer side of a central part of the connecting member 130 in order to rotate the connecting member 130 smoothly. Reference numeral 130C in the drawings denotes a cover of the piston 50, 130D denotes an inner supporting member of the piston, and N denotes a supporting member of the nut member 40.

Meanwhile, reference numeral 700 in FIG. 2 denotes a ball screw assembly comprising the piston 50 coupled to the ball screw 30 and the cover 130C thereof; the inner supporting member 130D of the piston; the supporting member 130E installed around the outer side of the piston; the third bearing 130A coupled to the connecting member 130 and the bearing supporting member 130B; and a packing 200.

Also, as illustrated in FIG. 3 and FIG. 4, the joint member 160 may be coupled to the bottom of the ball screw 30 with a mounting bolt 170 so that the ball screw 30 and the joint member 160 is integrally rotatable by the fourth bearing 180 when the ball screw 30 rotates.

As illustrated in FIGS. 3 and 4, the joint member 160 may comprise a central insertion part 160A; a fastening hole 160C formed in the center of a middle stepped portion 160B of the central insertion part 160A; and an upper cylindrical supporting part 160D and a lower cylindrical supporting part 160E. The fourth bearing 180 is installed between an inner side of a lower recess of the lower housing 20 and an outer side of the lower cylindrical supporting part 160E of the joint member 160. Reference numeral 10A illustrated in FIG. 2 denotes a hole for inserting the driven shaft 120, and 180A denotes a tension member.

A lower end portion of the ball screw is mounted on and coupled to an upper part of the stepped portion 160B while press-fitting and inserting the ball screw 30 inside the central insertion part 160A of the joint member 160. A head portion of the fastening hole 160C is brought into contact with a lower part of the stepped portion 160B, allowing solid coupling. Also, as illustrated in FIG. 5, the hollow shaft 60 and the joint member 160 are integrally formed, thereby reducing the number of parts and improving assemblability.

Especially, the nut member 40 allows an end portion 51 inside the piston 50 to contact one side of the upper part of the nut member 40 while being screw-coupled to the ball screw 30. An inner circumferential surface of the lower part of the piston 50 is configured to surround an outer side surface of the nut member 40. An outer circumferential surface of a lower part of the piston 50 is brought into contact with an inner side surface of the hollow shaft 60, and the first bearing 90 may be installed between the outer side surface of the upper part of the hollow shaft 60 and a recess inside the upper bracket 100.

Therefore, as disclosed in the prior art, in case of raising the nut member 40 when the ball screw 30 rotates by using the nut member 40 without a piston, the nut member 40 needs to act as a piston as well, which makes the change in the height of the nut member and in the inner structure of the block very complicated. However, according to the present invention, the nut member 40 is coupled to the piston 50 so that the piston 50 can rise as the nut member 40 rises, which does not require the significant change in the inner structure of the block 10.

As the upper part of the inner race of the first bearing 90 is coupled to the bent engaged annular protrusion 61 of the hollow shaft 60, and the outer side of the outer race of the first bearing 90 is brought into contact with the inner side of the supporting member 130E installed on the outer circumference of the piston 50 inside the block 10. Thereby, the first bearing 90 can be installed stably.

Additionally, the annular stop ring 190 is welded and installed on the outer side of the hollow shaft 60 at the bottom of the inner race of the first bearing 90, and thereby the first bearing 90 can be installed more stably. Additionally, the packing 200 is installed between a protrusion 52 of the upper part of the piston 50 and a protrusion 12 of the block 10, and thereby the leakage of brake oil can be prevented.

More specifically, as illustrated in FIG. 6, the first bearing 90 and the rotor module R are mounted on the annular locking protrusions 60A and 60B formed on the outer circumference of the upper and lower parts of the hollow shaft 60 of the present invention, thereby reducing the number of stop ring parts, removing welding process, and assembling the first bearing 90 while reducing the press-fitting section. As illustrated in FIG. 7, the first bearing 90 is press-fitted and the rotor module R is sliding-assembled on the outer circumference of the upper and lower parts of the hollow shaft 60 of the present invention, and the stop ring 190 may be welded on the lower circumference of the inner race of the first bearing 90.

Also, as illustrated in FIG. 9, the engaged annular protrusion 61 formed by curling the upper part of the hollow shaft 60 of FIG. 8 outwards allows the upper part of the inner race of the first bearing 90 to be press-fitted, and thereby the first bearing 90 can be installed stably.

Therefore, according to the present invention, the first bearing 90 is press-fitted and the rotor module R is sliding-assembled in the annular locking protrusions 60A and 60B, respectively, on the outer circumference of the upper and lower parts of the hollow shaft 60 of the present invention, thereby shortening assembly process and allowing solid assembly.

Furthermore, reference numeral 300 illustrated in FIG. 2 and FIG. 3 denotes the upper insulator coupled to the upper part of the stator module S; reference numeral 410 denotes the thermistor housing; reference numeral 420 denotes the thermistor sensor; reference numeral 510 denotes the bus-bar housing; reference numerals 520, 530 and 540 denote the bus-bar power connection terminals, which are U, V and W three-phase power input terminals, wherein the three-phase power input terminals are controlled by receiving a signal from an electronic control unit (ECU) assembled on the upper part of the block 10; and reference numeral 600 denotes the O-ring.

According to the present invention, the lower part of the ball screw 30 which helps rotation is assembled with the joint member 160, and the upper part thereof is supported by the driven shaft 120, thereby improving assemblability and reducing manufacturing costs. Additionally, through solid coupling, the present invention has the effect of promoting smooth rotation without shaking when the rotor module R operates, thereby reducing noises and vibration, and also sensing the motor speed by the motor speed sensing magnet sensor 150, thereby smoothly controlling the motor.

Additionally, through solid coupling, the present invention has the effect of promoting smooth rotation without shaking when the rotor module R operates, thereby reducing noises and vibration, and also sensing the motor speed by the motor speed sensing magnet sensor 150, thereby smoothly controlling the motor.

Additionally, according to the present invention, the nut member 40 rotates and rises when the ball screw 30 rotates, which causes the end portion 51 of the piston 50 to rise and the upper part of the piston 50 to be guided inside an inner guiding space part 13 of the block 10, thereby inducing the ejection of brake oil.

According to the present invention, the ball screw 30 stably rotates by the second bearing 140 and the third bearing 130A on the outer circumference of the connecting member 130 when the rotor module R operates. The hollow shaft 60 rotating ac-cordingly rotates the joint member 160 while rotating smoothly by the first bearing 90, and rotates more smoothly by the fourth bearing 180. Also, the lower part of the ball screw 30 stably rotates by the fourth bearing 180 while being supported by the joint member 160 and the mounting bolt 170 in the recess of the lower housing 20.

FIG. 10, which shows an excerpt of main parts of the present invention, is an exploded perspective view illustrating the coupling relation between the stator module S and the thermistor mounting means 400 and the bus-bar mounting means 500. FIG. 11 is a perspective view illustrating part of the coupling of FIG. 10.

FIG. 12 is an exploded perspective view illustrating the thermistor and bus-bar mounting means 400 and 500 of the present invention, and FIG. 13 is a perspective view illustrating the coupling of main parts excerpted of the present invention in which the thermistor and the bus-bar mounting means 400 and 500 of the present invention are coupled.

According to the above-described drawings, the thermistor mounting means 400 comprising a thermistor mounting holder 310 protrudingly formed on one side of the upper insulator 300 coupled to the stator module S is installed, and the bus-bar mounting means 500 is installed in the recess 320 formed on the circumferential surface of one side of the upper insulator 300.

The thermistor mounting means 400 comprises the thermistor mounting holder 310 protrudingly formed on one side of the upper insulator 300; and the thermistor housing 410 into which the thermistor sensor 420 stood by being inserted into the thermistor mounting holder 310 is inserted. The thermistor sensor 420 is protrudingly formed in a sensor guiding hole 14 formed by passing through the block 10 illustrated in FIG. 1 to sense the temperature inside the motor, thereby controlling the motor, and prevent the sudden rise in temperature inside the motor or protect against overcurrent conditions, thereby preventing the damage of the motor. The thermistor mounting means 400 sensing the temperature inside the motor may be installed with a simple structure by means of the upper insulator 300.

Additionally, the bus-bar mounting means 500 comprises the recess 320 formed on the circumferential surface of one side of the upper insulator 300; power connection terminal inserting holes 321 and 322, and the power connection terminal inserting hole 323 (said inserting holes may be formed as long holes), formed in the recess; the coupling member 550 for connecting the first power supply terminal, elastically mounted on the first annular protrusion 330 inside the upper insulator 300 in the recess 320 formed on the circumferential surface of one side of the upper insulator 300; the coupling member 560 for connecting the second power supply terminal, elastically mounted on the second annular protrusion 340 inside the upper insulator 300; the coupling member 570 for connecting the third power supply terminal, elastically mounted on the inner circumference of the lower part of the upper insulator 300; and the bus-bar housing 510 into which the bus-bar power connection terminals 520, 530 and 540 inserted and installed in the recess 320 are inserted. Locking protrusions 550A, 560A and 570A protrudingly formed in the coupling member 550 for connecting the first power supply terminal, the coupling member 560 for connecting the second power supply terminal, and the coupling member 570 for connecting the third power supply terminal, respectively, may be protrudingly formed through a plurality of locking holes 350 penetrated at predetermined intervals around the upper insulator 300.

The coupling member 550 for connecting the first power supply terminal, the coupling member 560 for connecting the second power supply terminal, and the coupling member 570 for connecting the third power supply terminal are molded with an elastic member made of an insulating material having elasticity. Thus, even though the coupling members are mounted on different locations of the upper insulator 300, each of the locking protrusions 550A and 560A, and the locking protrusion 570A may protrude through the plurality of locking holes 350 (said locking holes may be formed as long holes) formed by being penetrated at predetermined intervals around the upper insulator 300. Another forming structure may be used, for example, cutting parts through which the locking protrusions 550A and 560A, and the locking protrusion 570A can be taken out may be formed on the inner side of the upper insulator 300, or the height of the locking hole 350 may be changed.

Also, the locking protrusions 550A and 560A, and the locking protrusion 570A may be protrudingly formed by taking out flat members of the coupling member 550 for connecting the first power supply terminal, the coupling member 560 for connecting the second power supply terminal, and the coupling member 570 for connecting the third power supply terminal through the locking holes 350 and bending the flat members. Connection terminal insertion parts 550B, 560B and 570B, to be described below, into which the bus-bar power connection terminals 520, 530 and 540 of the coupling member 550 for connecting the first power supply terminal, the coupling member 560 for connecting the second power supply terminal, and the coupling member 570 for connecting the third power supply terminal, respectively, are inserted may be taken out through the power connection terminal inserting holes 321, 322 and 323. The bus-bar power connection terminals 520, 530 and 540 inserted into the connection terminal insertion parts 550B, 560B and 570B, respectively, may be connected to a circuit board 800.

The connection terminal insertion parts 550B, 560B and 570B into which the bus-bar power connection terminals 520, 530 and 540 of the coupling member 550 for connecting the first power supply terminal, the coupling member 560 for connecting the second power supply terminal, and the coupling member 570 for connecting the third power supply terminal are inserted, respectively, are located inside a lower guiding part 510A of the bus-bar housing 510 into which the bus-bar power connection terminals 520, 530 and 540 inserted and installed in the recess 320 formed on the circumferential surface of one side of the upper insulator 300 are inserted. The lower guiding part 510A of the bus-bar housing 510 is inserted into the recess 320 formed on the circumferential surface of one side of the upper insulator 300, and thereby the lower guiding part 510A of the bus-bar housing 510 can be maintained to be coupled without shaking.

The bus-bar power connection terminals 520, 530 and 540 are taken out through a terminal hole 15 formed in the block 10 illustrated in FIG. 1 and FIG. 2, and the bus-bar housing 510 is inserted into the terminal hole 15.

Through this constitution, the bus-bar mounting means 500 may be installed by means of the upper insulator 300, and the bus-bar power connection terminals 520, 530 and 540 are controlled while smoothly supplying power to the motor. Additionally, the thermistor mounting means 400 and the bus-bar mounting means 500 may be installed by means of the upper insulator 300, and thus the present invention can achieve easy assembling and compact motor.

The detailed description of the present invention described as above simply explains examples for understanding the present invention, but does not intend to limit the scope of the present invention. The scope of the present invention is defined by the ac-companying claims. Additionally, it should be construed that simple modifications or changes of the present invention fall within the scope of the present invention.

The invention claimed is:

1. An electronic brake motor structure with ball screw, comprising:
a lower housing (20) coupled to a block (10);
a ball screw (30) installed in the center inside the lower housing (20) and block (10), the ball screw having a screw (31) formed on an outer circumferential surface thereof;
a nut member (40) into which the ball screw (30) penetrates to be coupled therewith, the nut member having a groove pattern corresponding to the ball screw on an inner circumferential surface thereof;
a piston (50) coupled to an outer side of the nut member (40); a hollow shaft (60) coupled to an outer side of a lower part of the piston (50);
a rotor module (R) comprising a rotor (70) and a magnet (80), coupled to an outer side of the hollow shaft (60);
a stator module (S) coupled to an outer side of the rotor module (R);
an upper bracket (100) for mounting a first bearing (90) thereinside while supporting an upper part of the stator module (S);
a driven shaft (120) made of a brass material, coupled to an upper part of the ball screw (30) to support the ball screw; and
a joint member (160) coupled to a bottom of the ball screw with a mounting bolt (170) to support the ball screw (30) and a fourth bearing (180),
wherein the first bearing (90) is installed on an annular locking protrusion (60A) formed on an outer side of an upper part of the hollow shaft (60), and the rotor module (R) is installed on an annular locking protrusion (60B) formed on an outer side of a lower part of the hollow shaft (60), and
wherein the electronic brake motor structure with ball screw comprises a thermistor mounting means (400) and a bus-bar mounting means (500) which are installed on an upper insulator (300) coupled to an upper part of the stator module (S), and
wherein an engaged annular protrusion (61) formed by curling an upper part of the hollow shaft (60) outwards presses and supports an upper part of an inner race of the first bearing (90), and an outer side of an outer race of the first bearing (90) is brought into contact with an inside of a supporting member (130E) installed on the outer circumference of the piston (50) inside the block (10).

2. The electronic brake motor structure with ball screw according to claim 1, wherein the nut member (40) is coupled to an outer side of a lower part of the ball screw (30), and the upper bracket 100) is fastened and coupled between the lower housing (20) and the block (10) with a fastening bolt (110).

3. The electronic brake motor structure with ball screw according to claim 1, wherein a second bearing (140) is installed in an annular protrusion (120A) of the driven shaft (120) and a motor speed sensing magnet sensor (150) is installed in an upper central recess of the annular protrusion (120A) of the driven shaft (120).

4. The electronic brake motor structure with ball screw according to claim 1, wherein the joint member (160) comprises a central insertion part (160A); a fastening hole (160C) formed in the center of a middle stepped portion (160B) of the central insertion part (160A); and an upper cylindrical supporting part (160D) and a lower cylindrical supporting part (160E).

5. The electronic brake motor structure with ball screw according to claim 4, wherein a lower end portion of the ball screw is mounted on and coupled to an upper part of the stepped portion (160B) while press-fitting and inserting the ball screw (30) inside the central insertion part (160A) of the joint member (160) and a head portion of the fastening hole (160C) is brought into contact with a lower part of the stepped portion (160B).

6. The electronic brake motor structure with ball screw according to claim 1, wherein the fourth bearing (180) is installed between an inner side of a lower recess of a lower housing (20) and an outer side of the lower cylindrical supporting part (160E) of the joint member (160).

7. The electronic brake motor structure with ball screw according to claim 1, wherein the hollow shaft (60) and the joint member (160) are integrally formed.

8. The electronic brake motor structure with ball screw according to claim 1, wherein the thermistor mounting means (400) comprising a thermistor mounting holder (310) protrudingly formed on one side of the upper insulator (300) coupled to the stator module (S) is installed.

9. The electronic brake motor structure with ball screw according to claim 1, wherein a thermistor mounting means (400) comprises the thermistor mounting holder (310) protrudingly formed on one side of the upper insulator (300) and a thermistor housing (410) into which a thermistor sensor (420) stood by being inserted into the thermistor mounting holder (310) is inserted.

10. The electronic brake motor structure with ball screw according to claim 1, wherein an annular stop ring (190) is installed on the outer side of the hollow shaft (60) at the bottom of the inner race of the first bearing (90).

11. An electronic brake motor structure with ball screw, comprising:
- a lower housing (20) coupled to a block (10);
- a ball screw (30) installed in the center inside the lower housing (20) and block (10), the ball screw having a screw (31) formed on an outer circumferential surface thereof;
- a nut member (40) into which the ball screw (30) penetrates to be coupled therewith, the nut member having a groove pattern corresponding to the ball screw on an inner circumferential surface thereof;
- a piston (50) coupled to an outer side of the nut member (40); a hollow shaft (60) coupled to an outer side of a lower part of the piston (50);
- a rotor module (R) comprising a rotor (70) and a magnet (80), coupled to an outer side of the hollow shaft (60);
- a stator module (S) coupled to an outer side of the rotor module (R);
- an upper bracket (100) for mounting a first bearing (90) thereinside while supporting an upper part of the stator module (S);
- a driven shaft (120) made of a brass material, coupled to an upper part of the ball screw (30) to support the ball screw; and
- a joint member (160) coupled to a bottom of the ball screw with a mounting bolt (170) to support the ball screw (30) and a fourth bearing (180),
- wherein the first bearing (90) is installed on an annular locking protrusion (60A) formed on an outer side of an upper part of the hollow shaft (60), and the rotor module (R) is installed on an annular locking protrusion (60B) formed on an outer side of a lower part of the hollow shaft (60), and wherein the electronic brake motor structure with ball screw comprises a thermistor mounting means (400) and a bus-bar mounting means (500) which are installed on an upper insulator (300) coupled to an upper part of the stator module (S), and wherein the bus-bar mounting means (500) comprises a recess (320) formed on the circumferential surface of one side of the upper insulator (300); power connection terminal inserting holes (321, 322 323) formed in the recess (320); a coupling member (550) for connecting a first power supply terminal, elastically mounted on a first annular protrusion (330) inside the upper insulator (300); a coupling member (560) for connecting a second power supply terminal, elastically mounted on a second annular protrusion (340) inside the upper insulator (300); a coupling member (570) for connecting a third power supply terminal, elastically mounted on an inner circumference of a lower part of the upper insulator (300); and a bus-bar housing (510) into which bus-bar power connection terminals (520, 530 540) inserted and installed in the recess (320) are inserted, wherein locking protrusions 1550A, 560A 570A) protrudingly formed in the coupling member (550) for connecting the first power supply terminal, the coupling member (560) for connecting the second power supply terminal, and the coupling member (570) for connecting the third power supply terminal, respectively, are protrudingly formed through a plurality of locking holes (350) penetrated at predetermined intervals around the upper insulator (300).

12. The electronic brake motor structure with ball screw according to claim 11, wherein connection terminal insertion parts (550B, 560B 570B) into which the bus-bar power connection terminals (520, 530 540) of the coupling member (550) for connecting the first power supply terminal, the coupling member (560) for connecting the second power supply terminal, and the coupling member (570) for connecting the third power supply terminal are inserted, respectively, are located inside a lower guiding part (510A) of the bus-bar housing (510) into which the bus-bar power connection terminals (520, 530 540) inserted and installed in the recess (320) formed on the circumferential surface of one side of the upper insulator (300) are inserted, and the lower guiding part (510A) of the bus-bar housing (510) is inserted in the recess (320) formed on the circumferential surface of one side of the upper insulator (300).

* * * * *